United States Patent
Ha et al.

(10) Patent No.: US 12,305,607 B2
(45) Date of Patent: May 20, 2025

(54) RENEWABLE ENERGY GENERATION SYSTEM AND CONTROL METHOD THEREFOR

(71) Applicants: Hyundai Motor Company, Seoul (KR); Kia Corporation, Seoul (KR)

(72) Inventors: Dong Hyun Ha, Seoul (KR); Jung Hun Choi, Hwaseong-Si (KR); Jae Wung Jung, Bucheon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/829,780

(22) Filed: Jun. 1, 2022

(65) Prior Publication Data
US 2023/0151791 A1    May 18, 2023

(30) Foreign Application Priority Data
Nov. 18, 2021  (KR) .................. 10-2021-0159659

(51) Int. Cl.
*F03B 13/26* (2006.01)
*F03B 13/18* (2006.01)

(52) U.S. Cl.
CPC ............ *F03B 13/26* (2013.01); *F03B 13/182* (2013.01); *F05B 2220/706* (2013.01); *F05B 2220/708* (2013.01); *F05B 2240/93* (2013.01)

(58) Field of Classification Search
CPC .. F03B 13/26; F03B 13/182; F05B 2220/706; F05B 2220/708; F05B 2240/93
See application file for complete search history.

(56) References Cited

U.S. PATENT DOCUMENTS

2020/0385093 A1* 12/2020 Gordon, II ............. G05D 1/101

* cited by examiner

*Primary Examiner* — Joseph Ortega
(74) *Attorney, Agent, or Firm* — Morgan, Lewis & Bockius LLP

(57) ABSTRACT

A renewable energy generation method includes: a first production process in which electric power is produced by converting wave energy into electrical energy using a plurality of power generators having the shape of a roly-poly-like capsule that floats in a sea; a storage process in which the electrical energy produced in the first production process is stored in a first hub connected to the power generators; and a transportation process in which the electrical energy stored in the first hub is transported to a predetermined place by use of a transportation.

16 Claims, 8 Drawing Sheets

RENEWABLE ENERGY GENERATION SYSTEM AND CONTROL METHOD THEREFOR

CROSS-REFERENCE TO RELATED APPLICATIONS

The present application claims priority to Korean Patent Application No. 10-2021-0159659, filed Nov. 18, 2021, the entire contents of which is incorporated herein for all purposes by this reference.

BACKGROUND OF THE PRESENT DISCLOSURE

Field of the Present Disclosure

The present disclosure relates to a renewable energy generator and a control method therefor.

Description of Related Art

The statements in the present section merely provide background information related to the present disclosure and do not necessarily form related art.

To produce electricity, various methods exist and are widely used, including thermal power generation using chemical energy of fossil fuels, hydroelectric power generation using the potential energy of water by forming dams, and nuclear power generation using nuclear fission of uranium.

However, in recent years, resource depletion, safety issues, and eco-friendly values are increasingly propelling renewable energy productions in proportion over the three major power generation sources. Renewable energy includes power generation using infinite energy sources such as solar power, solar heat, tidal power, wave power, wind power, and geothermal heat.

More than 70% of the earth's surface is the sea that borders different countries with large bodies of water making them good environmental candidates to take advantage of the infinite energy of the waters, which garners increasing interest in wave power generation. Wave power generation refers to the production of electrical energy by use of the periodic vertical motion of the water surface caused by waves.

Large-scale wave power generation has spatial limitations to onshore installation. Also, installing a wave power generation device in distant seas and coastal and offshore waters faces difficulties in energy transfer and requires installing costly subsea cables, incurring considerable expenses.

Built-in, stationary wave power generation devices have difficulty producing stable electric power because of their irregular horizontal and vertical movements caused by irregular motions of waves. That is, it is hard to generate stable electric power by coping with sea surface changes, making it impossible to efficiently produce electric power.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a renewable energy generation method including: a first production process in which electric power is produced by converting wave energy into electrical energy using a plurality of power generators having the shape of a roly-poly-like capsule that floats in a sea; a storage process in which the electrical energy produced in the first production process is stored in a first hub connected to the power generators; and a transportation process in which the electrical energy stored in the first hub is transported to a predetermined place by use of transportation.

According to at least an exemplary embodiment of the present disclosure, the present disclosure provides a renewable energy generation system including: a plurality of power generators that float in a sea and produce electric power by converting wave energy into electrical energy; a first hub aligned to be connected to the power generators to store the electrical energy; a plurality of cables connecting the power generators and the first hub; a plurality of batteries configured to be coupled to or separated from the first hub and to store the electrical energy; and a plurality of transportations configured to be coupled to or separated from the first hub and to store the batteries therein.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
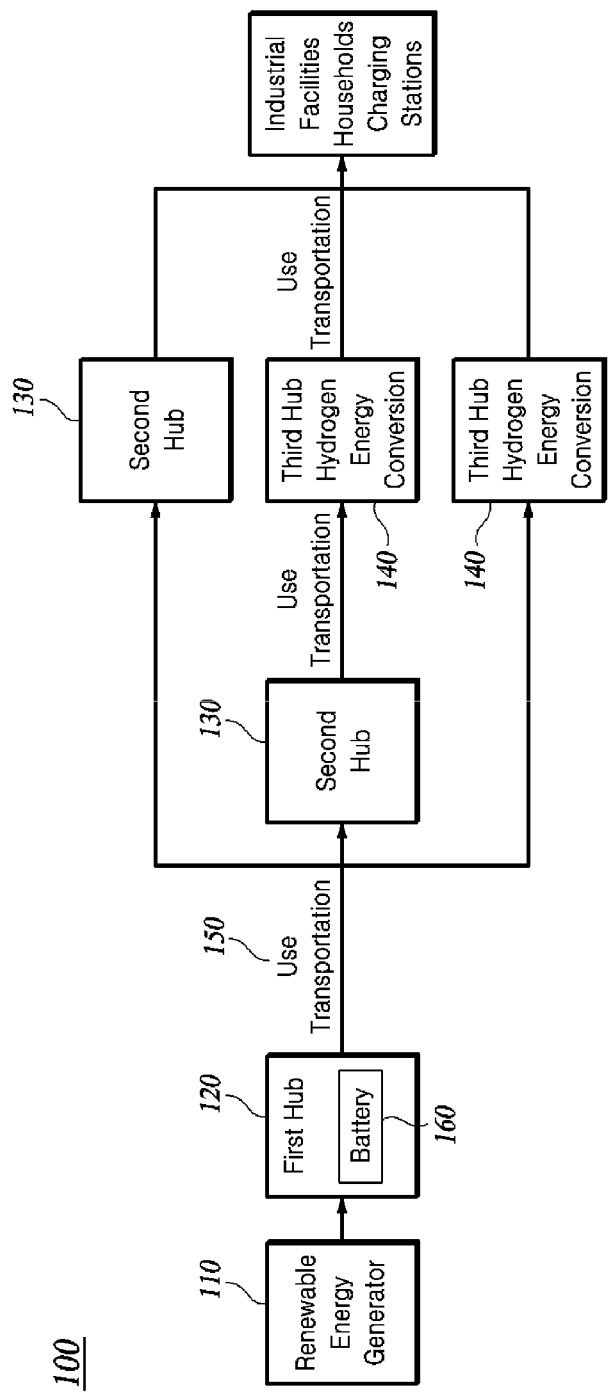
FIG. 1 is a block diagram of a renewable energy generation system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

A renewable energy generation system according to various exemplary embodiments of the present disclosure may produce electric power in coastal and offshore waters and distant seas by converting wave energy into electrical energy, and transport the electrical energy to land using transportation.

A renewable energy generation system according to various exemplary embodiments of the present disclosure may produce electric power effectively by controlling a plurality of power generators and motors by considering the intensity, speed, and cycle of waves.

The aspects of the present disclosure are not limited to the foregoing, and other aspects not mentioned herein will be able to be clearly understood by those skilled in the art from the following description.

Hereinafter, various exemplary embodiments of the present disclosure will be described in detail with reference to the accompanying drawings. In the following description, like reference numerals preferably designate like elements, although the elements are shown in different drawings. Furthermore, in the following description of various exemplary embodiments of the present disclosure, a detailed description of related known components and functions when considered to obscure the subject of the present disclosure will be omitted for clarity and for brevity.

Additionally, alphanumeric codes such as first, second, i), ii), (a), (b), etc., in numbering components are used solely for differentiating one component from the other but not to imply or suggest the substances, the order, or sequence of the components. Throughout the present specification, when parts "include" or "comprise" a component, they are meant to further include other components, not excluding thereof unless there is a particular description contrary thereto.

FIG. 1 is a block diagram of a renewable energy generation system using a renewable energy generator 110 according to at least an exemplary embodiment of the present disclosure.

As shown in FIG. 1, the renewable energy generation system 100 may include the renewable energy generator 110, a first hub 120, second hubs 130, third hubs 140, transportation 150, and a battery 160 in whole or in part.

Multiples of the renewable energy generator 110 may be interconnected by use of a cable, and they may float in the coastal waters and distant seas. The plurality of renewable energy generators 110 may each be shaped as a roly-poly toy or capsule. The plurality of renewable energy generators 110 may each convert wave energy into electrical energy to produce electric power.

The first hub 120 may be positioned to be surrounded by a plurality of renewable energy generators 110. The first hub 120 may be cabled to the plurality of renewable energy generators 110 and may receive electrical energy therefrom. The first hub 120 may receive and store electrical energy from the renewable energy generators 110. The electrical energy transferred to the first hub 120 may charge a battery 160 and transportation 150 coupled to the first hub 120. In the instant case, the transportation may be an unmanned aerial vehicle (UAV), an unmanned ship, a drone, or the like.

The second hubs 130 may each be positioned to be surrounded by a plurality of first clusters 710 including the first hub 120. The third hubs 140 may each be positioned to be surrounded by a plurality of second clusters 720 including the second hub 130. The relationship among the first, second, and third hubs 120 to 140 and the first and second clusters 710 and 720 will be described below in more detail.

The transportation 150 may deliver battery 160 and electrical energy between the first hub 120, the second hubs 130, and the third hubs 140 to each other. Additionally, the transportation may deliver the battery and electrical energy to the first hub 2, the second hubs 3, the third hubs 4, and a separate place located on the ground. Here, the separate place may be present and future mobility means such as an electric vehicle (EV), purpose-built vehicle (PBV), urban air mobility (UAM), robot, their electric charging stations, households, industrial facilities, etc. For example, with Vehicle To Grid (V2G) technology, a rechargeable eco-friendly vehicle may be linked to a power grid to use surplus power as provided by the present disclosure. The eco-friendly vehicle may work as a moving energy storage system (ESS) by use of the power grid to first charge the vehicle and feed the remaining electricity back to the power grid after the vehicle operation.

The renewable energy generation system 100 can convert electrical energy into hydrogen energy and transfer the converted hydrogen energy. When energy is stored in the first hub 120 to the third hubs 130 for a long time, a large amount of energy (1 TWh or more) may be stored. For large-capacity energy storage, hydrogen energy is a more suitable form of energy than electrical energy. Additionally, because hydrogen energy loses less than electrical energy during long-distance transport, hydrogen energy is particularly suitable for international transport of energy.

Figure 2:
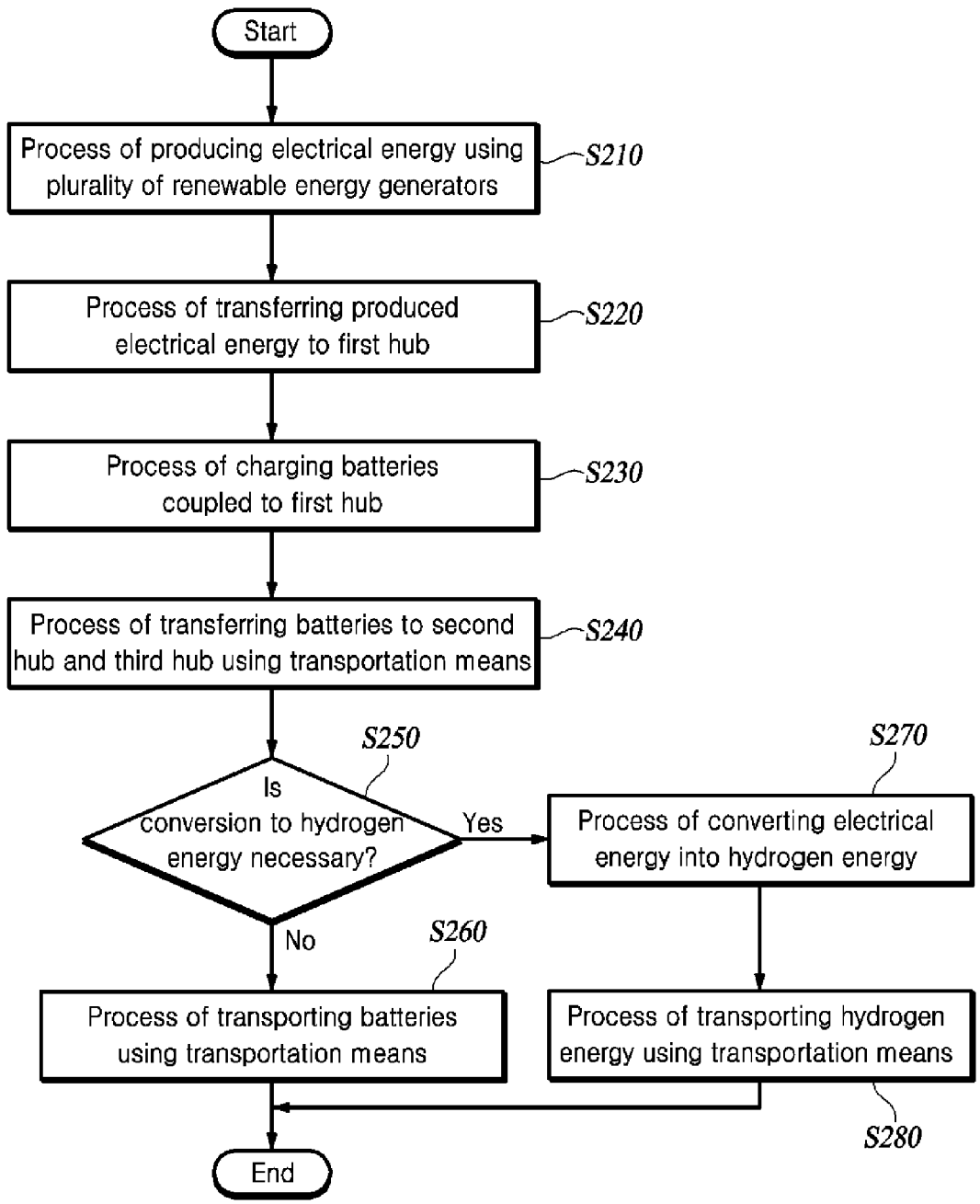
FIG. 2 is a flowchart of a renewable energy generation method according to an exemplary embodiment of the present disclosure.

FIG. 2 is a flowchart of a renewable energy generation method according to an exemplary embodiment of the present disclosure.

Referring to FIG. 2, in the renewable energy generation method according to an exemplary embodiment of the present disclosure, electrical energy is produced using a plurality of power generators 110 (S210). The plurality of power generators 110 each produce electric power by converting wave energy into electrical energy.

The electrical energy produced by the power generators 110 is transferred to the first hub 120 (S220). The plurality of power generators 110 and the first hub 120 are interconnected by cables, and the electrical energy may be transferred from the power generators 110 to the first hub 120 by use of the cables. The batteries 160 coupled to the first hub 120 may be charged with the electrical energy transferred to the first hub 120 (S230).

The transportation 150 may be coupled to the first hub 120 and transport the charged batteries 160 to the second hub 130 and the third hub 140 (S240). The transportation 150 are able to transfer the batteries 160 and the electrical energy among the first hub 120, the second hub 130, and the third hub 140.

The renewable energy generation system 100 determines whether it is necessary to convert the electrical energy into hydrogen energy (S250), and if necessary, converts the electrical energy into hydrogen energy (S270). When storing energy for a long period or transporting energy over a long distance, as in energy transportation between countries, conversion may be needed. Once the electrical energy is converted into hydrogen energy, the hydrogen energy may be transported using the transportation 150 (S280).

If it is not necessary to convert the electrical energy into hydrogen energy, the batteries 160 and the electrical energy may be transported using the transportation 150 (S260). The transportation 150 may transfer the batteries 160 and the electrical energy to the first hub 120, the second hub 130, and the third hub 140, and a place on the ground.

Figure 3:
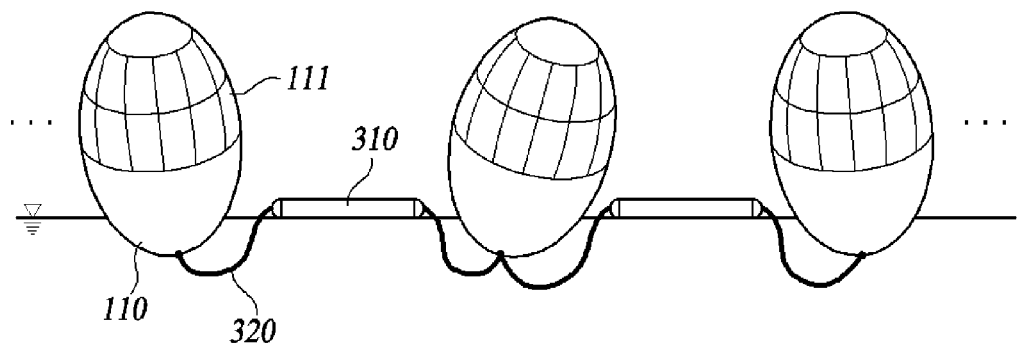
FIG. 3 is a view showing connections among power generators of a renewable energy generation system according to an exemplary embodiment of the present disclosure.

FIG. 3 is a view showing connections among power generators of a renewable energy generation system according to an exemplary embodiment of the present disclosure.

Referring to FIG. 3, a plurality of power generators 110 of the renewable energy generation system 100 may be interconnected using cables. The cables may include a float type cable 310 and a flexible power cable 320. One end portion of the flexible power cable 320 may be connected to both end portions of the float type cable 310. The other end portion of the flexible power cable 320 may be connected to the power generators 110.

The float type cable 310 may float on the surface of a sea, and prevent collision between the plurality of power generators 110. Also, the float type cable 310 may include a stopper on either end, to alleviate impact on the power generators 110 and the float type cable 310 when colliding with the power generators 110.

The flexible power cable 320 may transfer the electrical energy produced by one of the plurality of power generators 110 to the first hub 120 and another power generator 110. The flexible power cable 320 may be a wire type so as not to interfere with the movement of the power generators 110.

A solar panel 111 may be provided on a surface of the power generators 110. The solar panel 111 may be provided at an upper portion of the surface of the power generators 110, that is, a portion which is not submerged by the sea. The power generators 110 may convert solar energy into electrical energy by use of the solar panel 111, as well as converting wave energy into electrical energy.

Figure 4:
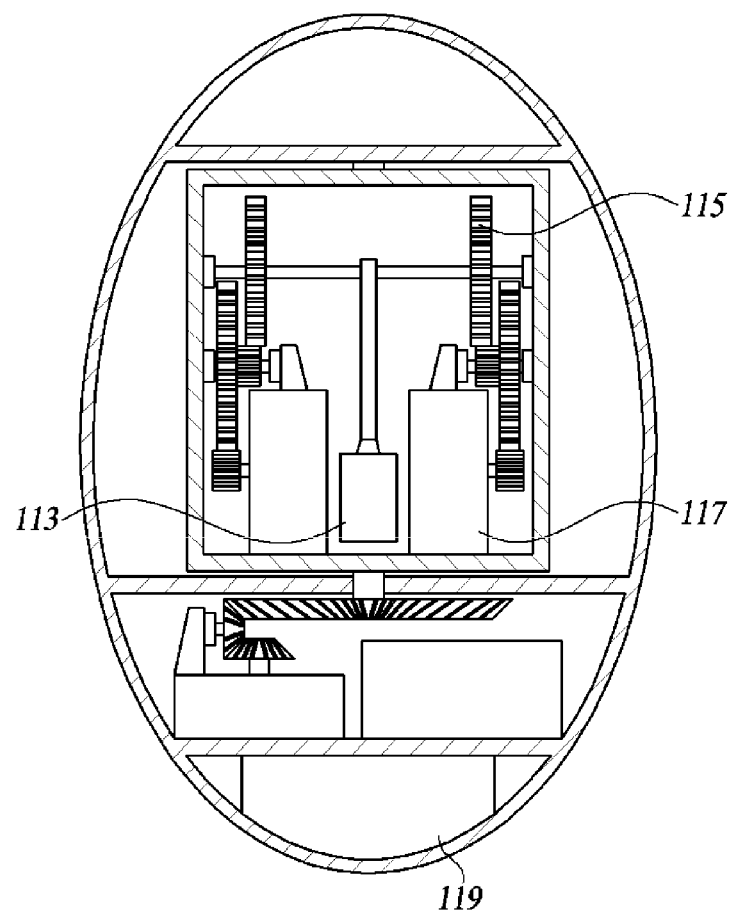
FIG. 4 is a cross-sectional view of the inside of a power generator of a renewable energy generation system according to an exemplary embodiment of the present disclosure.

FIG. 4 is a cross-sectional view of the inside of a power generator of a renewable energy generation system according to an exemplary embodiment of the present disclosure.

Referring to FIG. 4, the power generator 110 of the renewable energy generation system may include all or part of a pendulum 113, a gear unit 115, a generation motor 117, an internal battery 119, and a controller.

The power generator 110 of the renewable energy generation system may produce electric power by converting wave energy into electrical energy using the motion of the pendulum 113. The pendulum 113 inside the power generator 110 may move with the motion of waves, and the pendulum's kinetic energy may produce electrical energy. The motion of the pendulum 113 may be transferred to the generation motor 117 through the gear unit 115. The generation motor 117 may produce electrical energy and store it in the internal battery 119.

The controller of the renewable energy generator 110 according to at least an exemplary embodiment of the present disclosure may take into account parameters such as the intensity, speed, and frequency of the waves to control the renewable energy generator 110. For example, the controller may increase the electricity generation efficiency of the renewable energy generator 110 by rotating the same by taking into account the intensity, speed, and frequency of the waves. The controller may be configured to control the renewable energy generator 110 to use various forms of wave energy such as rolling, pitching, yawing, potential energy, and vertical and horizontal kinetic energy.

Figure 5:
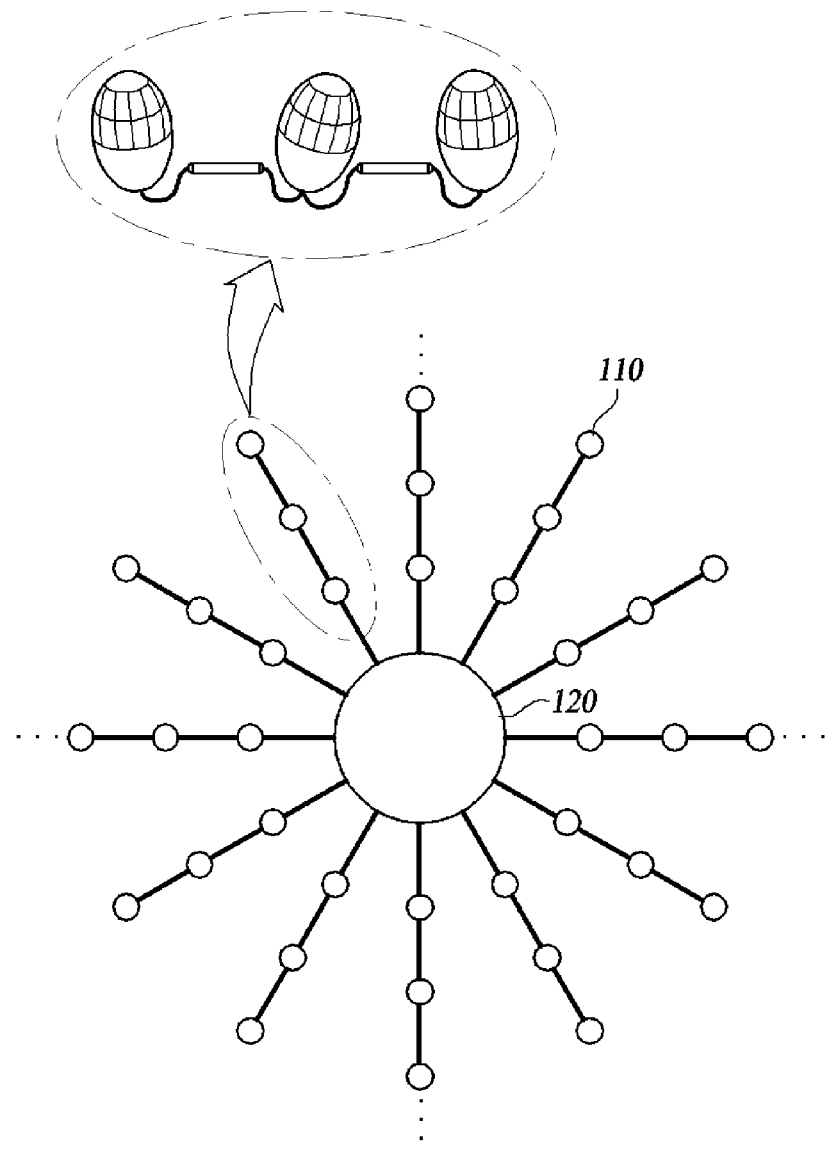
FIG. 5 is a view showing connections among power generators and a first hub of a renewable energy generation system according to an exemplary embodiment of the present disclosure.

FIG. 5 is a view showing connections among power generators and a first hub of a renewable energy generation system according to an exemplary embodiment of the present disclosure.

Figure 6:
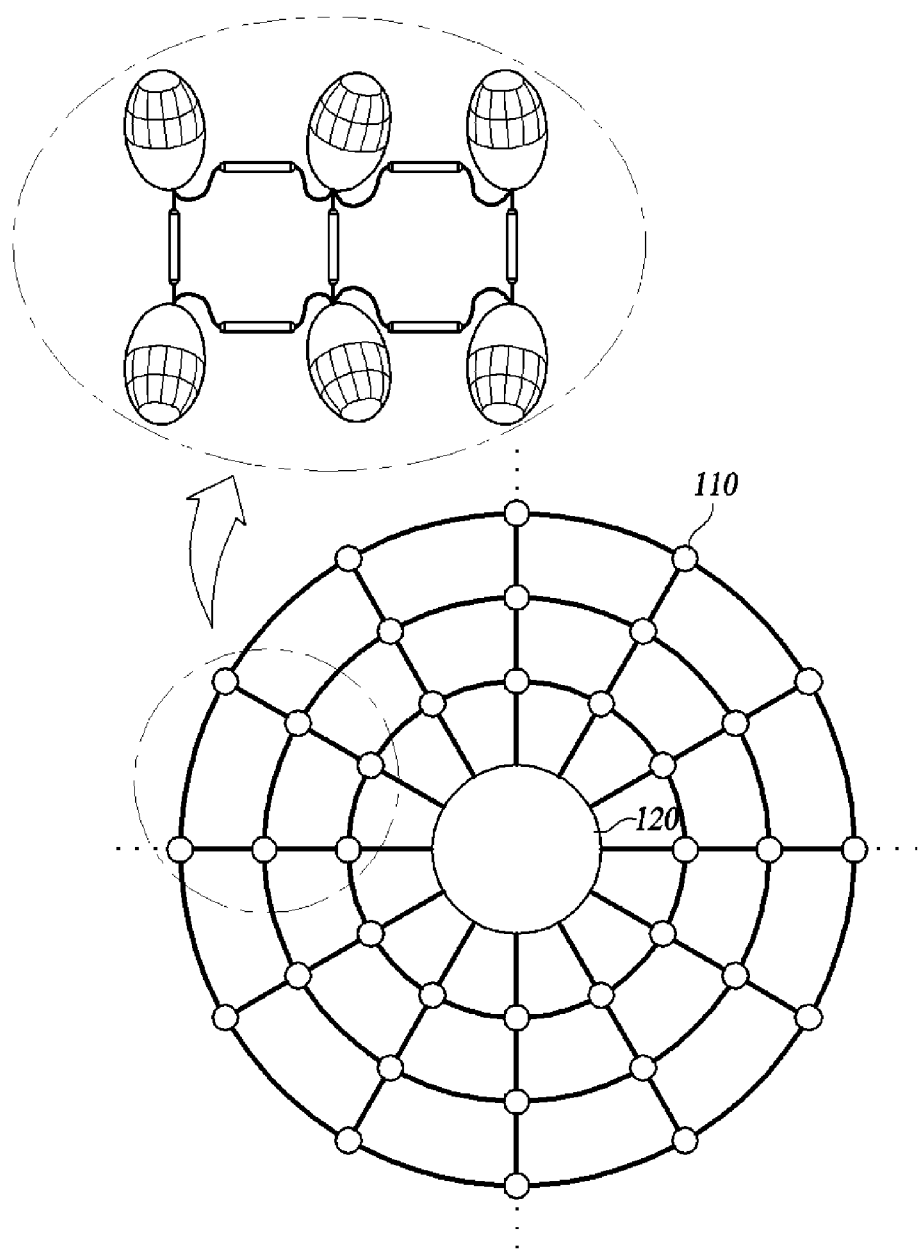
FIG. 6 is a view showing connections among power generators and a first hub of a renewable energy generation system according to another exemplary embodiment of the present disclosure.

FIG. 6 is a view showing connections among power generators and a first hub of a renewable energy generation system according to another exemplary embodiment of the present disclosure.

Referring to FIG. 5 and FIG. 6, the first hub 120 of the renewable energy generation system 100 according to an exemplary embodiment of the present disclosure may be positioned in such a way as to be surrounded by the plurality of power generators 100. The first hub 120 may be connected to the plurality of power generators 100 by cables and receive electrical energy from the plurality of power generators 100. The first hub 120 may store the electrical energy received from the plurality of power generators 100.

FIG. 5 is a view showing the plurality of power generators 100 being connected in series. FIG. 6 is a view showing the plurality of power generators 100 being connected in parallel. The structure of the renewable energy generation system 100 of the present disclosure is not limited to this, and the plurality of power generators 110 may be interconnected according to various embodiments. The renewable energy generation system 100 may be scaled down or up by connecting the plurality of power generators 110 based on its power generation capacity.

Figure 7:
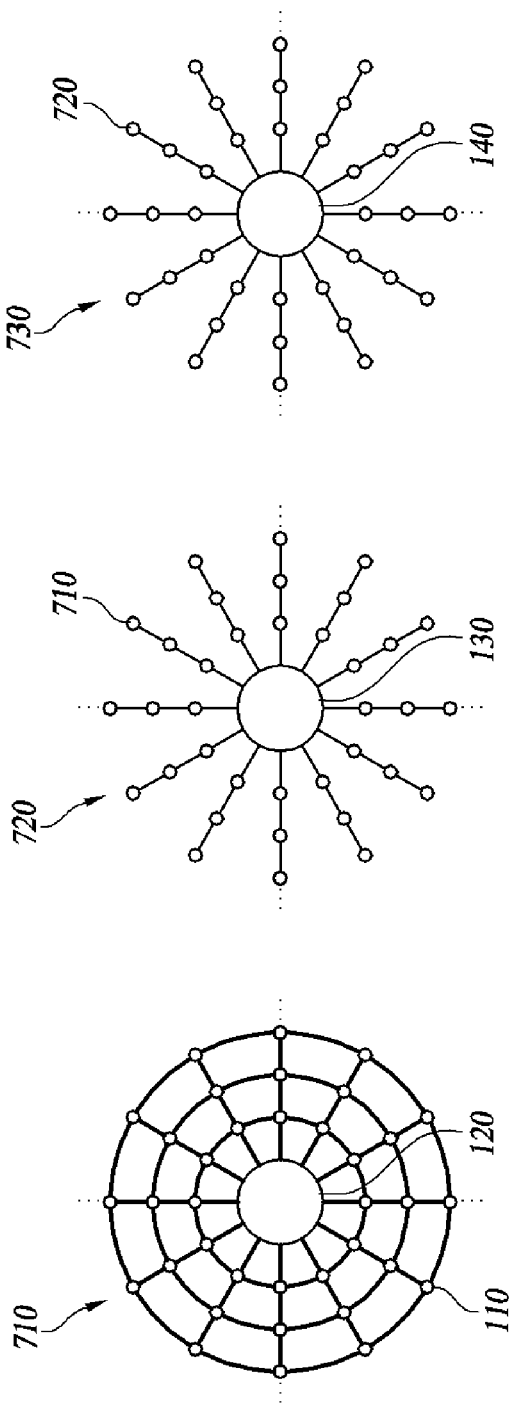
FIG. 7 is a view showing relationships among first, second, and third hubs of a renewable energy generation system according to an exemplary embodiment of the present disclosure

FIG. 7 is a view showing relationships among first, second, and third hubs of a renewable energy generation system according to an exemplary embodiment of the present disclosure.

Referring to FIG. 7, the renewable energy generation system 100 may include all or part of the first cluster 710, the second cluster 720, and the third cluster 730.

The first cluster 710 may include a first hub 120 and a plurality of power generators 100. The first hub 120 and the plurality of power generators 110 surrounding the first hub 120 may form the first cluster 710. The renewable energy generation system 100 according to the present disclosure may include a plurality of first clusters 710.

The second cluster 720 may include a second hub 130 and a plurality of first clusters 710. The first hub 120 may be positioned in such a way as to be surrounded by the plurality of first clusters 710. The second hub 130 and the plurality of first clusters 710 surrounding the second hub 130 may form the second cluster 720. The renewable energy generation system 100 according to the present disclosure may include a plurality of second clusters 720.

The third cluster 730 may include a third hub 140 and a plurality of second clusters 720. The third hub 140 may be positioned in such a way as to be surrounded by the plurality of second clusters 720. The third hub 140 and the plurality of second clusters 720 surrounding the third hub 140 may form the third cluster 730. The renewable energy generation system 100 according to the present disclosure may include a plurality of third clusters 730. The structure of the renewable energy generation system 100 is not limited to this, and may be scaled down or up by building up a plurality of clusters.

Figure 8:
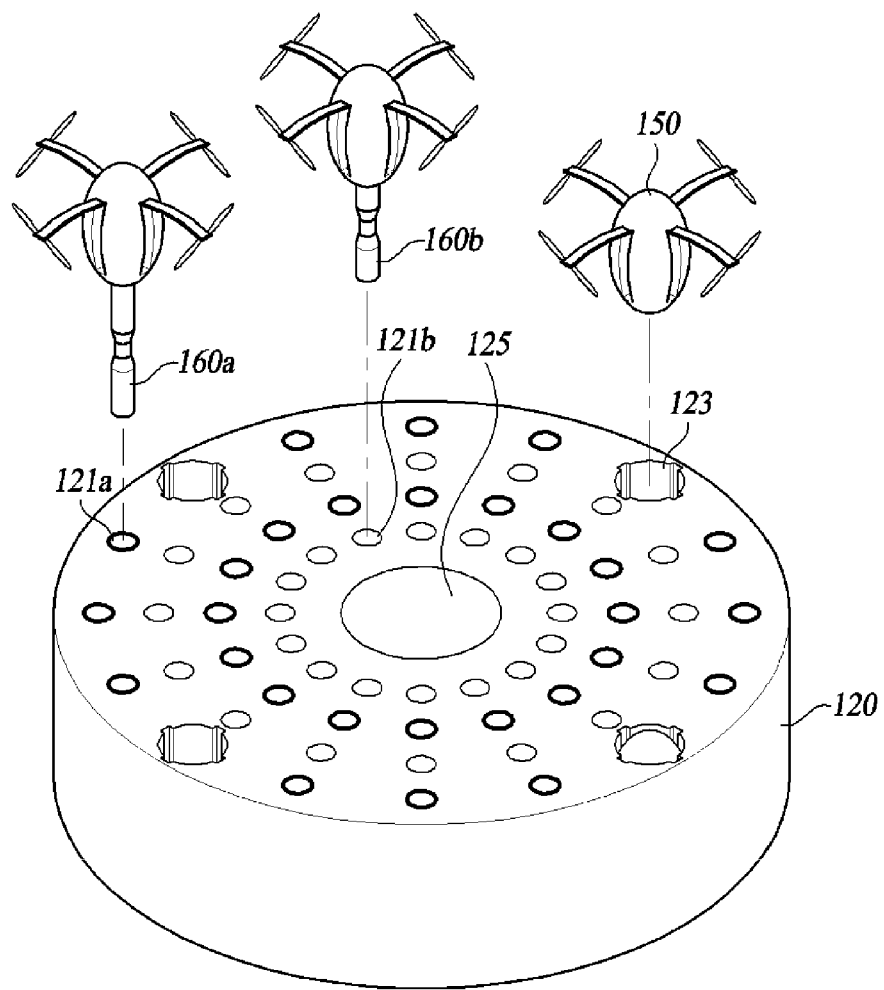
FIG. 8 is a view showing in detail a first hub of a renewable energy generation system according to an exemplary embodiment of the present disclosure.

FIG. 8 is a view showing in detail a first hub of a renewable energy generation system according to an exemplary embodiment of the present disclosure.

Figure 9:
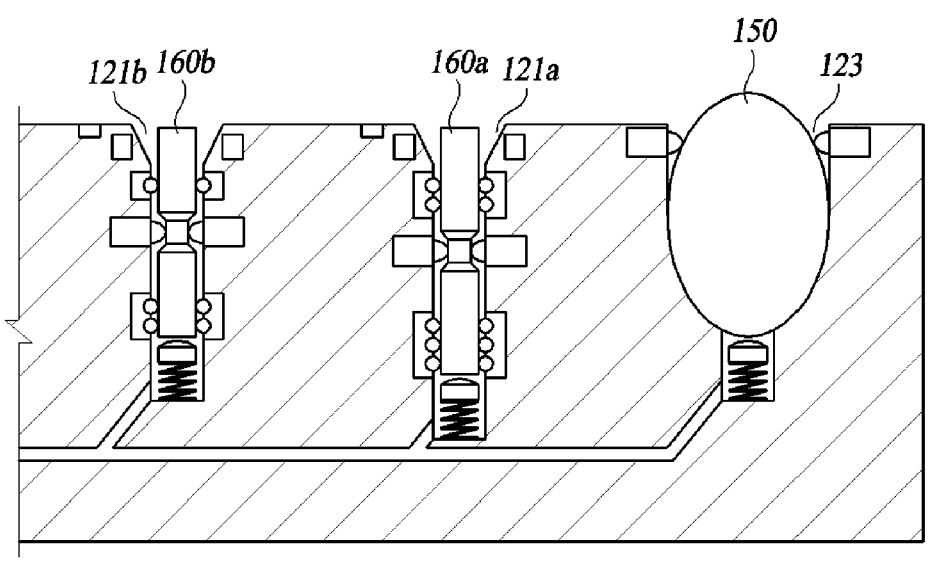
FIG. 9 is a view showing a cross-section of a first hub of a renewable energy generation system according to an exemplary embodiment of the present disclosure.

FIG. 9 is a view showing a cross-section of a first hub of a renewable energy generation system according to an exemplary embodiment of the present disclosure.

Referring to FIG. 8, the first hub 120 of the renewable energy generation system 100 may include a plurality of first cabins 121, a plurality of second cabins 123, and a storage place 125.

The plurality of first cabins 121 may be formed in the first hub 120 so that batteries 160 are coupled to or separated from them. The first cabins 121 may charge the batteries 160 by receiving electrical energy from a plurality of electric power reducing devices 110.

The batteries 160 of the present disclosure may come in two types according to size: long distance and short distance. The first cabins 121 may include first cabins 121b for long distances to or from which long-distance batteries 160b are coupled and separated, and first cabins 121a for short distances to or from which short-distance batteries 160a are coupled and separated. The transportation 150 may select the long-distance batteries 160b and the short-distance batteries 160a by considering weather conditions, transportation distance, etc and transport the batteries 160. The transportation 150 may access the first cabins 121 to mount or collect the batteries 160.

The plurality of second cabins 123 may be formed so that the transportation 150 are coupled to or separated from them. The second cabins 123 may charge the transportation 150 by receiving electrical energy from the plurality of power generators 110.

The storage place 125 may be positioned at the center of the first hub 120. The transportation 150, such as UAM and UAV, for transporting the batteries 160 may be charged and stored in the storage place 125.

Referring to FIG. 9, the first cabins 121 and the second cabins 123 may include receiving portions that are recessed in the first hub 120. The receiving portions of the first cabins 121 may be formed so that the batteries 160 are coupled to or separated from them. The receiving portions of the first cabins 121 may have a shape corresponding to the batteries 160 so that the batteries 160 are coupled to or separated from them. For example, the receiving portions of the first cabins 121a for long distances to or from which the long-distance batteries 160 are coupled or separated, and the receiving portions of the first cabins 121a for short distances to or from which short-distance batteries 160a are coupled and separated may have a size corresponding the batteries 160.

The receiving portions of the second cabins 123 may be formed so that the transportation 150 are coupled to or separated from them. The receiving portions of the second cabins 123 may have a shape corresponding to the transportation 150 so that the transportation 150 is coupled to or separated from them. The receiving portions of the second cabins 123 may have both a circular or expandable concept in which a propeller or arm may fit. For example, the receiving portions of the second cabins 123 may include a space in which wings or the like of the transportation 150 are contained.

According to an exemplary embodiment of the present disclosure, exemplary embodiment of the present disclosure, a renewable energy generation system according to an exemplary embodiment has the effects of producing electric power in coastal and offshore waters and distant seas by converting wave energy into electrical energy without limiting conditions for installation and increasing economic efficiency using transportation without installing costly subsea cables.

According to an exemplary embodiment of the present disclosure, exemplary embodiment of the present disclosure, a renewable energy generation system according to an exemplary embodiment has an effect of increasing the efficiency of the renewable energy generation system by controlling a plurality of power generators and motors by considering the intensity, speed, and cycle of waves.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A renewable energy generation method comprising:
   producing electric power by converting wave energy into electrical energy using a plurality of power generators that floats in a sea;
   storing the electrical energy produced in a first hub connected to the power generators; and
   transporting the electrical energy stored in the first hub to a predetermined place by use of a transportation,
   wherein the first hub includes:
      first cabins configured so that a plurality of batteries are coupled thereto or separated therefrom; and
      second cabins configured so that the transportation is coupled thereto or separated therefrom.

2. The renewable energy generation method of claim 1, wherein the power generators are connected in series or parallel to each other and aligned to surround the first hub.

3. The renewable energy generation method of claim 1, wherein the wave energy is converted into the electrical energy using pendulums provided inside the power generators.

4. The renewable energy generation method of claim 1, further including:
   producing electric power by converting solar energy into electrical energy using a solar panel provided on a surface of the power generators.

5. The renewable energy generation method of claim 1, wherein in the producing of the electric power, the power generators are controlled by a controller with consideration of intensity, speed, and cycle of waves.

6. The renewable energy generation method of claim 1, wherein the electrical energy is transferred to the first hub by use of a plurality of cables connecting the power generators and the first hub.

7. The renewable energy generation method of claim 1, wherein, in the transporting the electrical energy, the batteries charged by being mounted to the first hub are transported using the transportation.

8. The renewable energy generation method of claim 1, further including:
   collecting the batteries transported to the predetermined place in the first hub.

9. A renewable energy generation system comprising:
   a plurality of power generators that floats in a sea and produces electric power by converting wave energy into electrical energy;
   a first hub aligned to be connected to the power generators to store the electrical energy;
   a plurality of cables connecting the power generators and the first hub;
   a plurality of batteries configured to be coupled to or separated from the first hub and to store the electrical energy; and
   a plurality of transportations configured to be coupled to or separated from the first hub and to store the batteries therein,
   wherein the first hub includes:
      first cabins configured so that the batteries are coupled thereto or separated therefrom; and
      second cabins configured so that the transportations are coupled thereto or separated therefrom.

10. The renewable energy generation system of claim 9, wherein the power generators are connected in series or parallel to each other and aligned to surround the first hub.

11. The renewable energy generation system of claim 9, wherein the power generators include pendulums and motors therein, and are configured to convert the wave energy into the electrical energy by use of kinetic energy of the pendulums.

12. The renewable energy generation system of claim 9, wherein the power generators further include a solar panel that is provided on a surface of the power generators and produces electric power by converting solar energy into the electrical energy.

13. The renewable energy generation system of claim 9, further including:
   a second hub aligned to be surrounded by the first hub; and
   a third hub aligned to be surrounded by the second hub.

14. The renewable energy generation system of claim 13, wherein the transportations are configured to transport the batteries among the first, second, and third hubs and a predetermined place.

15. The renewable energy generation system of claim 9, wherein the transportations are at least one of a drone, an unmanned aerial vehicle, and an unmanned ship.

16. A renewable energy generation method comprising:
   producing electric power by converting wave energy into electrical energy using a plurality of power generators that floats in a sea;
   storing the electrical energy produced in a first hub connected to the power generators; and
   transporting the electrical energy stored in the first hub to a predetermined place by use of a transportation, and
   wherein the predetermined place includes:
      the first hub;
      a second hub aligned to be surrounded by the first hub;
      a third hub aligned to be surrounded by the second hub; and
      at least a motility including a ground electric vehicle, a purpose-built vehicle, urban air mobility, or a robot, an electric charging station, a common house, and an industrial facility.

* * * * *